July 10, 1956

A. P. KRUEGER 2,754,115

DISPENSERS FOR PRESSURE-SENSITIVE TAPE

Filed Oct. 18, 1950

Inventor
Alfred P. Krueger
By
Rockwell & Bartholow
Attorneys

July 10, 1956            A. P. KRUEGER            2,754,115
DISPENSERS FOR PRESSURE-SENSITIVE TAPE
Filed Oct. 18, 1950            4 Sheets-Sheet 3
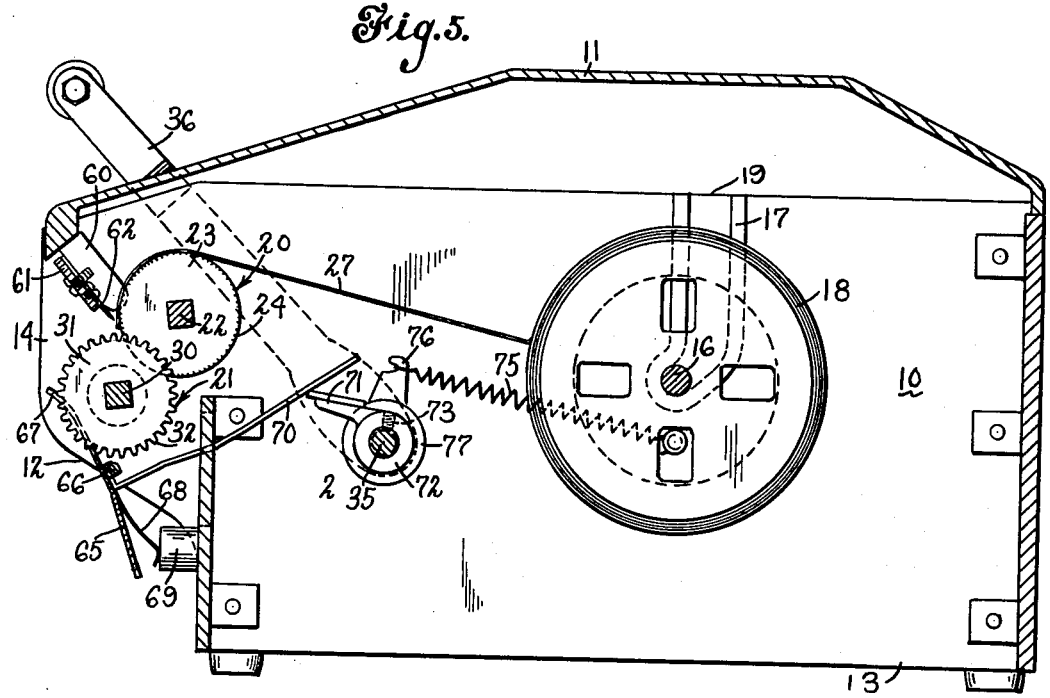
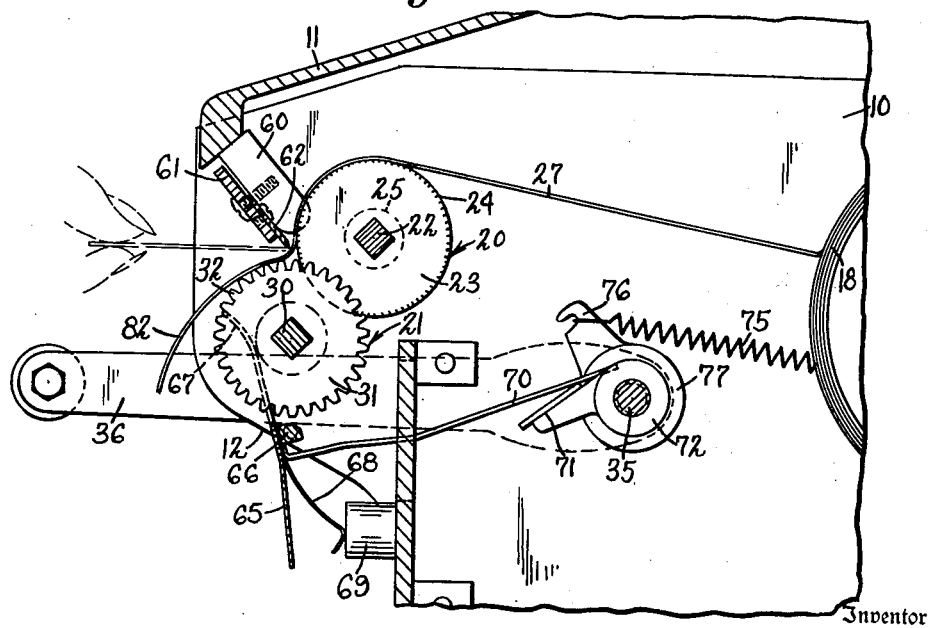
Inventor
Alfred P. Krueger
Attorneys July 10, 1956

A. P. KRUEGER 2,754,115

DISPENSERS FOR PRESSURE-SENSITIVE TAPE

Filed Oct. 18, 1950

Inventor
Alfred P. Krueger
By
Rockwell & Bartholow
Attorneys

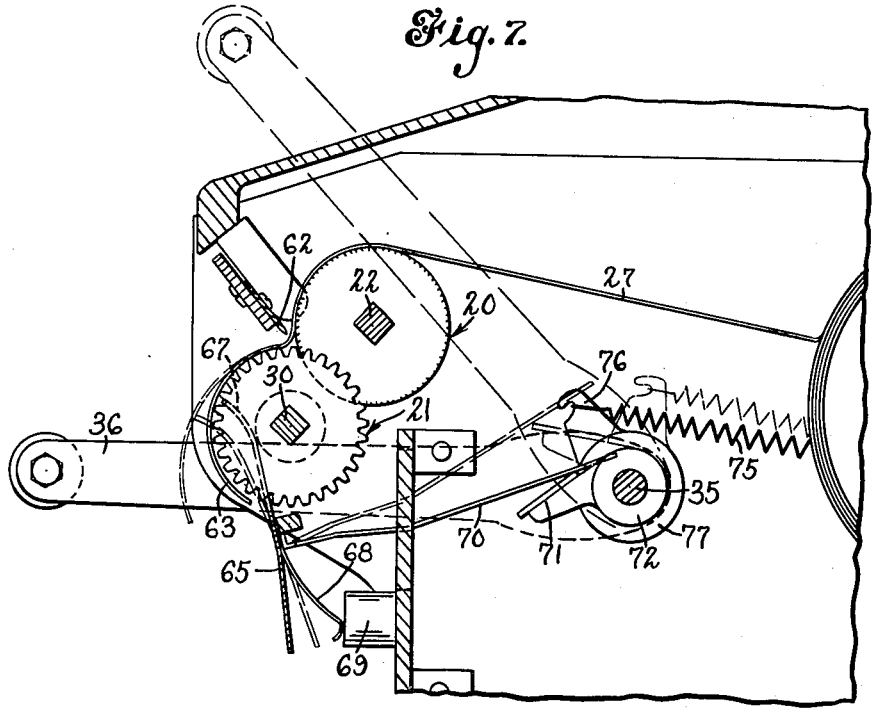
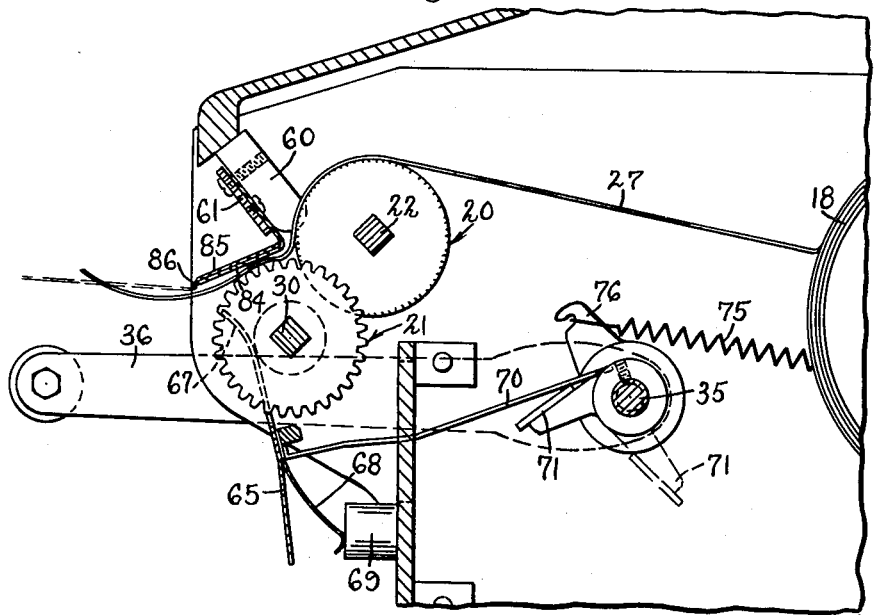

United States Patent Office 2,754,115
Patented July 10, 1956

2,754,115
DISPENSERS FOR PRESSURE-SENSITIVE TAPE

Alfred P. Krueger, Stratford, Conn., assignor to Derby Sealers, Incorporated, Derby, Conn., a corporation of Connecticut Application October 18, 1950, Serial No. 190,705

1 Claim. (Cl. 271—2.4)

This invention relates to dispensers for pressure-sensitive tapes and more particularly to a device for dispensing tape from a supply roll by the operation of a crank or lever as distinguished from the type of dispensers in which the leading end of the tape is grasped by the hand and drawn from the dispenser by a direct pull exerted by the user. It will be understood, however, that some features of the invention may be applicable to machines of the "pull" type and also to machines and dispensing tapes other than those which are pressure sensitive.

In the dispensing of pressure-sensitive tapes, where a movable feed member is employed such as a feed roller to draw the tape from the supply roll, it is necessary to strip the tape from this roll if a free end is to be presented to the user, and it is desirable that a free end be provided where the end of the tape is to be grasped by the operator and the tape drawn against a severing member or knife to be cut off. In the present machine, it is designed to sever the tape in this manner and provision is also made for the dispensing of measured lengths of tape by limiting the stroke of the operating lever or crank.

It will be appreciated that where the tape is drawn against a severing member and this member is located at some distance from the feed roll, inaccuracies in measurement often result, as the tape, in the severing process, is drawn taut between the point at which it clings to the feed roll and the point at which it is grasped by the operator. Thus more or less of it may be stripped from the feed roll and the length of the severed strip will vary depending upon how much of its length is stripped from the feed roll and how much remains adhering thereto. In a device made according to the present invention, such inaccuracies are eliminated by positioning the severing member closely adjacent the path of the tape as it is fed from the machine so that it will be drawn against the severing member before any appreciable length has been stripped from the feed roll in the severing operation.

Difficulty has also been experienced in the feeling of pressure-sensitive tape in that such tapes are variously affected by atmospheric conditions depending upon the particular type of tape which is being dispensed. There are a great many different kinds of pressure-sensitive tape being manufactured at the present time and the tendency of the free end of the tape to curl varies greatly. In some instances there is little tendency to curl and the free end of the tape will assume a relatively straight path when projected from the machine. A second condition arises, however, in connection with some kinds of pressure-sensitive tape in that a free end of the tape will tend to curl or roll up toward the back or non-tacky face of the tape. In still other varieties of tape, the free end will tend to curl toward the tacky side of the tape and thus present a third condition. Provision is made in the present machine for meeting any one of these conditions and, therefore, handling any type of tape which may be encountered.

One object of the present invention is to provide a new and improved dispenser for pressure-sensitive tapes.

Another object of the invention is to provide a dispenser for pressure-sensitive tapes such that an accurately measured length of tape will be dispensed from the apparatus and be severed against a severing member.

A still further object of the invention is to provide a dispenser for pressure-sensitive tapes such that a free end of the tape will be presented in a position spaced from any part of the machine so that it may be readily grasped by the operator.

A further object of the invention is to provide a machine for dispensing pressure sensitive tapes by the operation of an oscillating lever or handle, the handle having a one-way driving connection with the feed roller and in which means are provided for preventing "backlash" of the feeding mechanism or the tendency of the feed mechanism to move rearwardly upon a rearward or back stroke of the lever.

To these and other ends the invention consists in the novel features and combinations of parts to be hereinafter described and claimed.

In the accompanying drawings,

Fig. 5 is a sectional view on line 5—5 of Fig. 3;

Fig. 6 is a view similar to Fig. 5 showing the parts in a different position;

Fig. 7 is a view similar to Fig. 6 showing the use of the apparatus with tape of a different character; and Fig. 8 is a view similar to Fig. 7 showing a modified form of severing mechanism.

To illustrate a preferred embodiment of my invention I have illustrated a tape-dispensing apparatus comprising a casing 10, having a cover 11. The front of the casing is provided with an overhanging portion 12 which extends forwardly beyond the base 13 so that the device may be placed at the edge of a table or other support, and, if the piece of tape dispensed is relatively long, it may depend freely from the device without coming in contact with the support. Adjacent the front portion of the frame or case the latter is provided with an opening, as shown at 14, adjacent to which the feed and stripping mechanism is disposed, as will be hereinafter described, so that the dispensed tape may issue through the opening.

Figure 4:
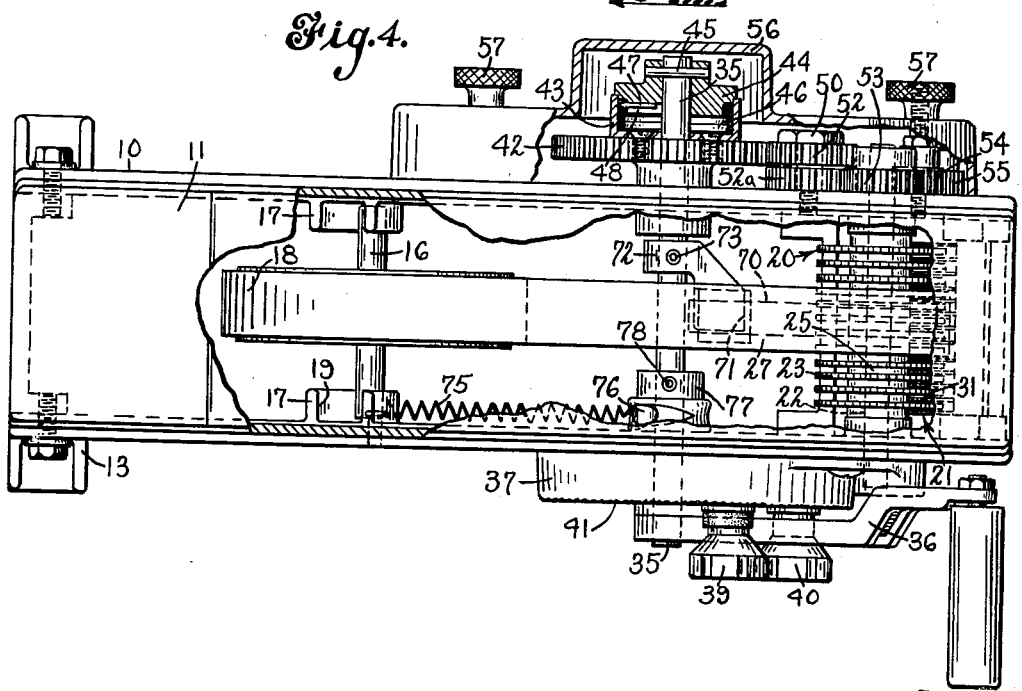
Fig. 4 is a top plan view with the cover broken away.

As shown particularly in Fig. 4 of the drawings, a spindle 16 is loosely held in guides or cradles 17, one at each side of the casing 10, and a supply roll of tape 18 is rotatably supported on this spindle. These guides are open at the top, as shown at 19 in Figs. 4 and 5, so that when the cover is removed the spindle 16 may be removed in order that the supply roll of tape may be slipped upon the spindle.

The feeding mechanism comprises a feed roll 20 and a stripping mechanism designated generally by the numeral 21. The feed roll comprises a non-circular shaft 22 upon which a plurality of disks 23 are non-rotatably, but otherwise loosely, mounted in spaced relation, these disks being provided with square openings in which the shaft is received. The feed disks are knurled at their edges as shown at 24 and are held in spaced relation by the spacing washers 25, the thickness of the washers, however, allowing a certain amount of play between the disks. As shown in Figs. 5 to 8, the tape as designated at 27 leads from the supply roll 18 to the upper side of the feed roll 20, the tracky surface of the tape adhering to the disks as it passes thereover.

The stripping mechanism 21 comprises a non-circular shaft 30 upon which are mounted a plurality of spaced disks 31, which disks are provided on their peripheries with stripping teeth 32, these disks having non-circular openings to receive the shaft 30 and being otherwise somewhat loosely mounted on the shaft to permit lateral play. As is illustrated in the drawings, the disks 31 extend between the disks 23 of the feed roll so that the end of the tape cannot be carried about the disks 23 but will be stripped therefrom by being engaged by the teeth 32 of the disks 31. It may here be noted that the surface speed of the stripper disks 31 in their rotating movement will be somewhat greater than that of the feed disks 23 in order that the stripper disks will strip themselves from the tape in the operation of the device as the tape is fed by the disks 23.

An operating shaft 35 is mounted in the side walls of the casing, this shaft extending through the casing walls at both ends, as shown in Fig. 4, and upon one of the extended ends is secured the operating handle or lever 36. At the outside of the casing a quadrant 37 is secured to the casing wall, this quadrant being provided with an arcuate slot 38 within which are adjustably mounted movable stops 39 and 40 to limit the movement of the handle at either end of the stroke. It will be understood that both of these stops are adjustable in the slot 38 and may be secured in any desired adjusted position by means of the serrations or teeth 41 on the aquadrant 37. The adjustment of both of these stops not only permits adjustment of the length of the stroke of the handle and, therefore, of the length of the strip of tape which is dispensed, but also permits adjustment of the normal or starting position of the handle so that the angle through which the handle moves may be located over any desired portion of the segment 38.

Upon the other end of the operating shaft 35 is loosely mounted a gear 42 and to this gear is secured a hollow cup-shaped member 43. A hub 44 is secured to the shaft 35 by the pin 45 so that this hub will always turn with the shaft, which hub projects into the member 43. A coil spring 46 is snugly disposed in the latter member and one end 47 of this spring is turned inwardly and lodged within a slot 48 in the hub 44 so that rotation of the hub with the shaft in one direction will tend to wind or tighten the spring, while rotation in the other direction will tend to unwind or loosen the coils of the springs. This arrangement provides an effective one-way connection between the shaft 35 and the gear 42 in that rotation of the shaft 35 in the direction to unwind or loosen the spring 46 will effect rotation of the cup-shaped member 43 and, therefore, of the gear 42 due to friction between the spring and the member 43. Rotation of the hub 44 in the opposite direction will tend to tighten the spring and reduce the friction between it and the member 44 and permit the shaft 35 to rotate without effecting rotation of the member 43 and the gear 42.

Figure 1:
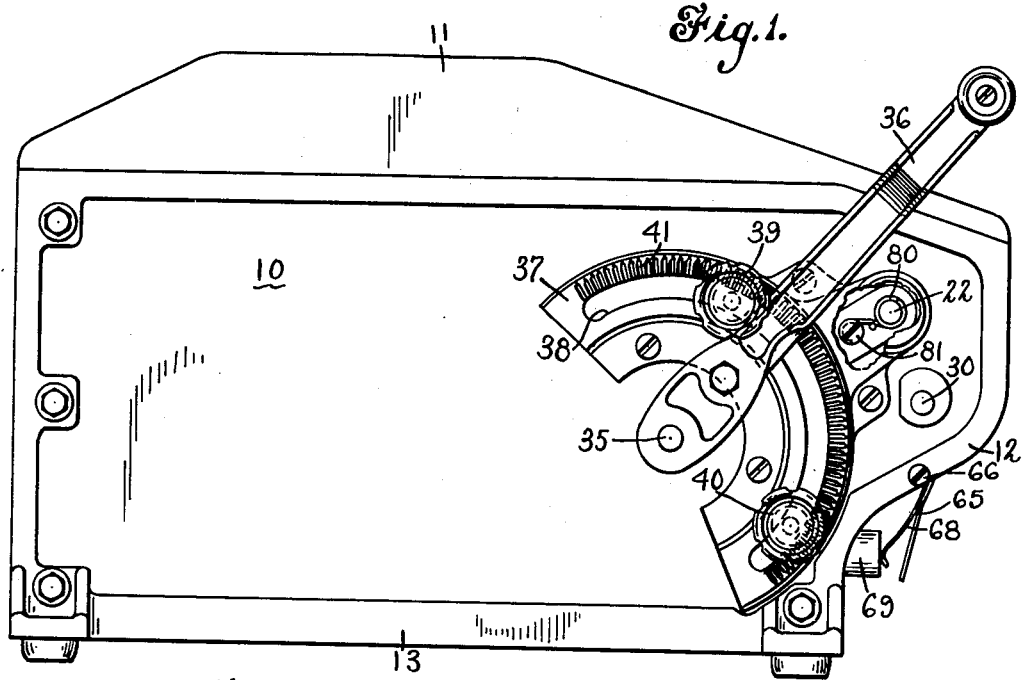
Fig. 1 is a side elevational view of a dispenser for pressure-sensitive tape embodying my invention.

A post or screw 50 is mounted in one of a series of openings 51 in the side wall of the casing and upon this post is rotatably mounted a double gear, or a pair of integrally connected gears 52 and 52ª. The gear 52 meshes with the gear 42, while the gear 52ª meshes with a gear 53 secured to the shaft 22 of the feed roll 20 so as to rotate this latter shaft and effect rotation of the feeding disks 23 when the lever 36 is moved in a forward direction. Upon the back stroke of this lever or movement in a counter-clockwise direction, as shown in Fig. 1, the gear 42 will not be moved and hence the feed disks will remain stationary. An idler pinion 54 is rotatably mounted upon the frame, the teeth, of which are in mesh with the gear 53 and also in mesh with those of a pinion 55 secured to the shaft 30 of the stripping disks 31. As the pinions 54 and 55 are smaller than the gear 53, the shaft 30 of the stripping mechanism will be rotated at a speed in excess of that of the shaft 22. As shown in Fig. 4, a gear case 56 covers the gearing mechanism just described, which may be held in place by the nuts 57.

Upon each of the side walls of the casing is provided a lug 60, and to these lugs secured a knife-supporting bar 61 to which is detachably secured the knife or severing member 62. From Figs. 5 and 6 of the drawings, it will be apparent that the cutting edge of the knife 62 extends downwardly into the bite or angle between the feeding disks 23 and the stripping disks 31 so that, as shown in Fig. 6, when the tape is drawn over the knife, the severing takes place closely adjacent the surface of the disks 23 so that the tape does not have to be drawn away from the surface of these disks to be engaged with the knife and, therefore, accurate severing of a length of tape is effected. As the tape normally follows the surfaces of the feeding disks 23 until removed therefrom by stripping disks 31, the tape will also lie relatively closely to the bite between the feeding disks and stripping disks, as shown in full lines in Fig. 6, so that a slight movement of the tape from its normal path will cause it to engage the cutting edge of the severing member.

As previously stated, it will sometimes occur that the protruding end of the tape during the dispensing operation will tend to curl inwardly and thus follow around the stripping disks 31, as shown, for example, in full lines at 63 in Fig. 7. This will sometimes occur notwithstanding the fact that the tape does not adhere to the teeth 32 due to the fact that these teeth are moving at a greater speed than is the tape during the dispensing operation. If a tape of this character is being used, it may be desirable to employ some means to cause the tape to extend outwardly from the stripping disks so that the free end can be grasped by the user in order that it may be severed. To this end I have provided a stripper in the form of a comb comprising a body portion 65 pivoted to the casing of the device at 66 and a plurality of spaced curved teeth 67 which extend upwardly between the stripping disks 31 and hold these disks in spaced relation.

A spring 68 urges this comb to an inoperative position, shown in Fig. 6, where the teeth 67 lie within the outline of the stripping disks 31, the spring being secured to the member 65 and bearing against a boss 69 on the casing. Also secured to the member 65 is a rearwardly projecting arm 70 designed to rest against, and be engaged by, a lug 71, carried by a collar 72, secured to the shaft 35 by a set screw 73 so that the position of this collar and the lug 71 may be adjusted as desired. The shaft 35 is normally urged in a counterclockwise direction, as shown in Fig. 1, by a spring 75 secured at one end to the casing and secured at the other end to the arm 76, carried by a collar 77, secured to the shaft 35 by the set screw 78. With this arrangement the arm 36 is normally urged against the stop member 39, as shown in Fig. 1, when the device is idle.

It will be understood that by loosening the set screw 73 the collar 72 may be adjusted to any desired position which is necessary according to the part of the quadrant 37 over which the lever 36 is adjusted to move (according to the position of the stops 39 and 40) in order that the comb will be properly operated. Also the lug 71 may be dropped to a complete inoperative position, shown in dotted lines in Fig. 8, so that no operation of the comb will be secured. This latter adjustment would be employed when a tape is used which either does not tend to curl at all or which would tend to curl upwardly or toward the non-tacky side of the tape.

In order to prevent any backlash or rearward movement of the feeding mechanism when the lever 36 is released and returned to its rest position by the spring 75, I provide a mechanism shown in Fig. 1 to prevent rearward movement of the shaft 22. As shown in Figs. 1 and 4, one end of this shaft projects through the casing at the opposite side from that upon which the gears are located. A spring 80 is coiled about the end of this shaft and one end of the spring secured to the wall of the casing by the screw 81, the other end of the spring being left free. When the shaft moves in a clockwise direction, as shown in Fig. 1, the coils of the spring 80 will tend to be unwound and permit free movement of the shaft. However, upon any tendency of the shaft 22 to turn in a counterclockwise direction, as shown in Fig. 1, the coils of the spring will tend to be tightened and prevent such movement of the shaft. This will prevent any back feeding of the tape and will prevent inaccuracies of measurement.

The operation of the device thus far described is as follows: The normal or rest position of the parts is shown in Fig. 5 wherein the lever 36 is held against the stop 39 by spring 75 and the free end of the tape is shown as lying under the edge of the severing blade 62 which would be its position following a previous operation. The lever 36 is now drawn forwardly or in a counterclockwise direction as shown in Fig. 5 to the position shown in Fig. 6. This effects a feeding of the tape due to its adherence to the feeding disks 23, the tape being stripped from the feeding disks by the stripping disks 31 so that the free end projects outwardly as shown at 82 in Fig. 6. It will be noted that at the beginning of the operation, the teeth 67 of the stripping comb are held in an outward position by the engagement of the lug 71 with the arm 70. Rotation of the shaft 35, however, to the position shown in Fig. 6 will move this lug downwardly so as to permit the teeth 67 to be moved inwardly between the stripping disks so that it will be out of the way of the extreme end of the tape by the time it reaches the position opposite the ends of the fingers.

If the tape is one which will not tend to curl, it will stand more or less in the position shown at 82 in Fig. 6 where it can be grasped by the fingers of the operator and by a sidewise movement severed against the edge of the knife 62. When, however, the tape is the type that tends to curl toward the stripper disks, as shown at 63 in Fig. 7, it would be difficult for the operator to grasp the tape if the latter were in the curled position shown adjacent the stripper disks. At the conclusion of the feeding operation, the lever 36 is released and the spring 75 returns this lever to the full line position shown in Fig. 5 or the dotted line position shown in Fig. 7. In this position of the parts, the lug 71 strikes the arm 70 and moves the teeth 67 outwardly as shown in Fig. 5 and in dotted lines in Fig. 7 so as to move the tape outwardly from the stripper disks in order that it may be grasped by the operator.

If it is not necessary to use the stripper as indicated with the type of tape shown in Fig. 6, the lug 71 is moved to its dotted line position shown in Fig. 8 where it will not contact the arm 70 and the stripper comb will be held in its inward or inoperative position by the spring 68. Even though the comb is not operated by the lug 71, it may always be operated manually by the engagement of the hand of the operator with the body portion 65 of the comb.

In the use of some kinds of tape, the latter, as stated, tends to curl toward the non-tacky side thereof or upwardly as shown in the drawings. If a tape of this character is being dispensed, it may be preferable to use the structure shown in Fig. 8. In this modification of the invention, an L-shaped knife-supporting member is secured to the bar 61, this member having a forwardly projecting portion 84 overlying the teeth of the stripper disks. A severing member 85 is secured to the portion 84 of the knife support and projects therefrom at its forward end where it is turned downwardly slightly, as shown at 86, so that it may be engaged with the tape to sever the latter. This overlying surface of the member 84 will prevent the upward curling of the tape which otherwise might curve upwardly and rearwardly into the space adjacent the bite between the feeding and stripping disks. In the case also the use of the stripping comb will probably not be necessary, hence the lug 71 will be dropped to an inoperative position.

Figure 2:
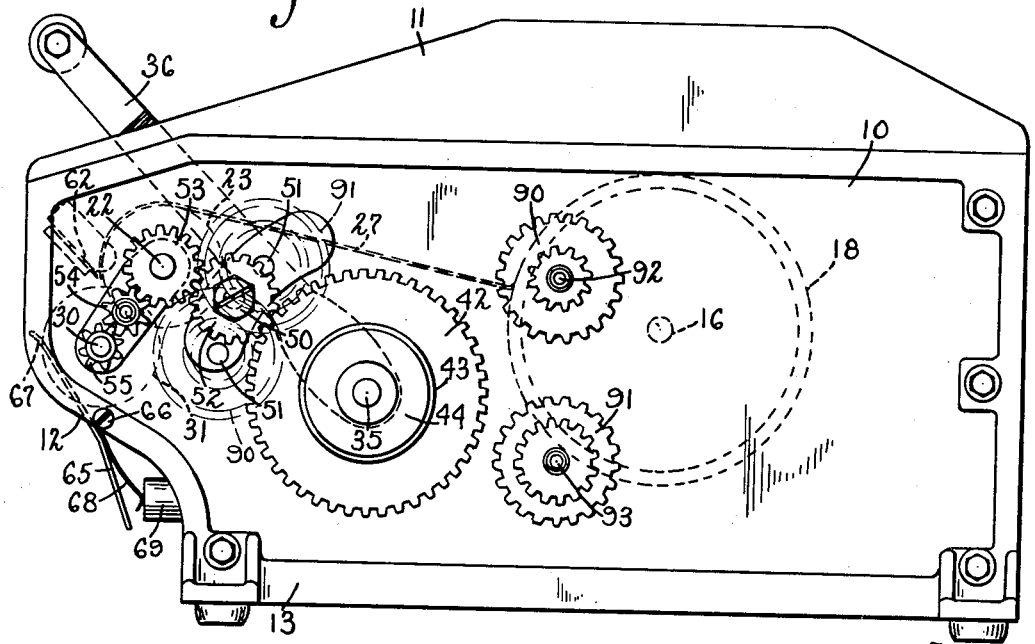
Fig. 2 is a similar view showing the other side of the apparatus, the gear casing having been removed to show the interior mechanism.
Figure 3:
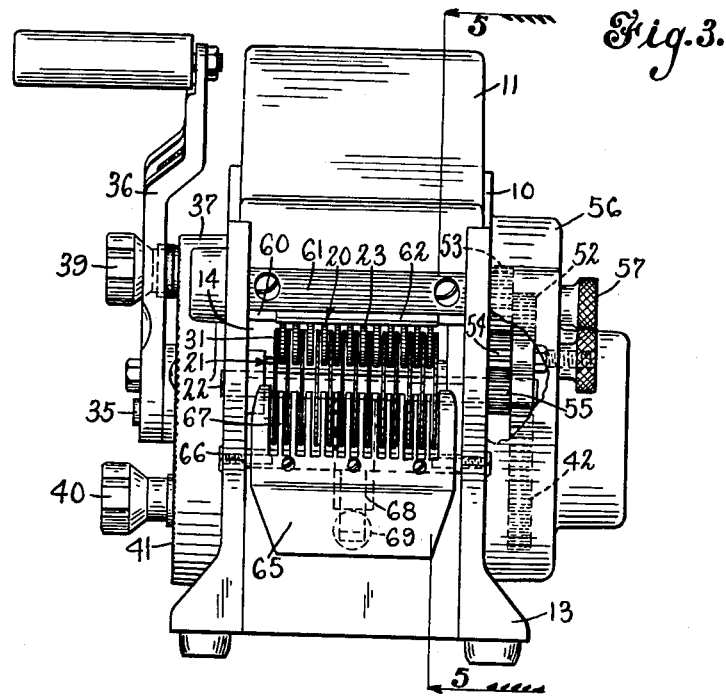
Fig. 3 is a front elevational view.

In some instances it may be necessary to vary the speed of the feed roll with respect to that of the lever 36. This may be readily done by substituting suitable double gears for the gears 52 and 52a, and such gears are shown at 90 and 91 in Fig. 2, where, as illustrated, they may be conveniently stored by being mounted upon posts 92 and 93 on the side of the main casing and within the gear casing 56. It is for this purpose that I have provided a plurality of openings 51 for the post 50 which supports these gears, when in use, and if the gears 90 or 91 are employed, the post 50 will be moved into others of the openings 51.

It will be obvious that I have provided a tape-dispensing apparatus which will be useful with many different kinds of tapes, the characteristics of which vary greatly. This variation is not only in the tendency of the tapes to lie flat or to curl, as has been mentioned above, but also in their tensile strength and their resistance to being severed against a severing blade. The location of the edge of the severing blade closely adjacent the point at which the tape reaches the feeding means or in the bite between the feed roll and the stripper roll will insure an accurate severing of the tape regardless of its character.

As illustrated, both the feeding disks 23 and the stripping disks 31 are mounted upon their respective shafts so as to have slight lateral play, as described. They may, if desired, however, be rigidly secured upon the shafts, or be formed integrally with the main or central portions of the rollers of which they are a part. For example, a solid roller may be milled out in annular rings to provide spaced disk-like members projecting from the central or hub portions. The term "spaced disks" as used in the claim, therefore, is not limited to separate disks mounted upon a shaft, but also includes spaced disks members formed integrally with the body of the shaft or roller.

While I have shown and described a preferred embodiment of my invention, it will be understood that it is not to be limited to all of the details shown, but is capable of modification and variation within the spirit of the invention and within the scope of the claim.

What I claim is:

A tape-dispensing apparatus comprising a rotatable feed element, means for operatively supporting and rotating said element, said element comprising a plurality of spaced disks, stripping means comprising a plurality of spaced disks the edge of which extend between the disks of the feeding members, a comb pivotally supported on the frame adjacent said stripping means and having teeth extending between said stripping disks, an oscillatable lever having an operativee stroke to actuate said feeding means and a return stroke during which said feeding means is inactive, and means actuated by said lever during its return stroke to move said comb about its pivot.

References Cited in the file of this patent
UNITED STATES PATENTS

| | | |
|---|---|---|
| 489,787 | Bowen | Jan. 10, 1893 |
| 1,972,850 | McCarthy | Sept. 4, 1934 |
| 1,972,851 | McCarthy | Sept. 4, 1934 |
| 2,110,828 | Diesbach | Mar. 8, 1938 |
| 2,233,361 | Anderson et al. | Feb. 25, 1941 |
| 2,275,410 | Anderson et al. | Mar. 10, 1942 |
| 2,348,355 | Miller | May 9, 1944 |
| 2,441,821 | Kendall | May 18, 1948 |
| 2,454,844 | Sharpe | Nov. 30, 1948 |
| 2,507,446 | Krueger | May 9, 1950 |
| 2,574,332 | Kreuger | Nov. 6, 1951 |
| 2,582,705 | Kreuger | Jan. 15, 1952 |